June 2, 1970 A. J. MAITILASSO 3,515,078
INCINERATOR
Filed March 13, 1969 2 Sheets-Sheet 1
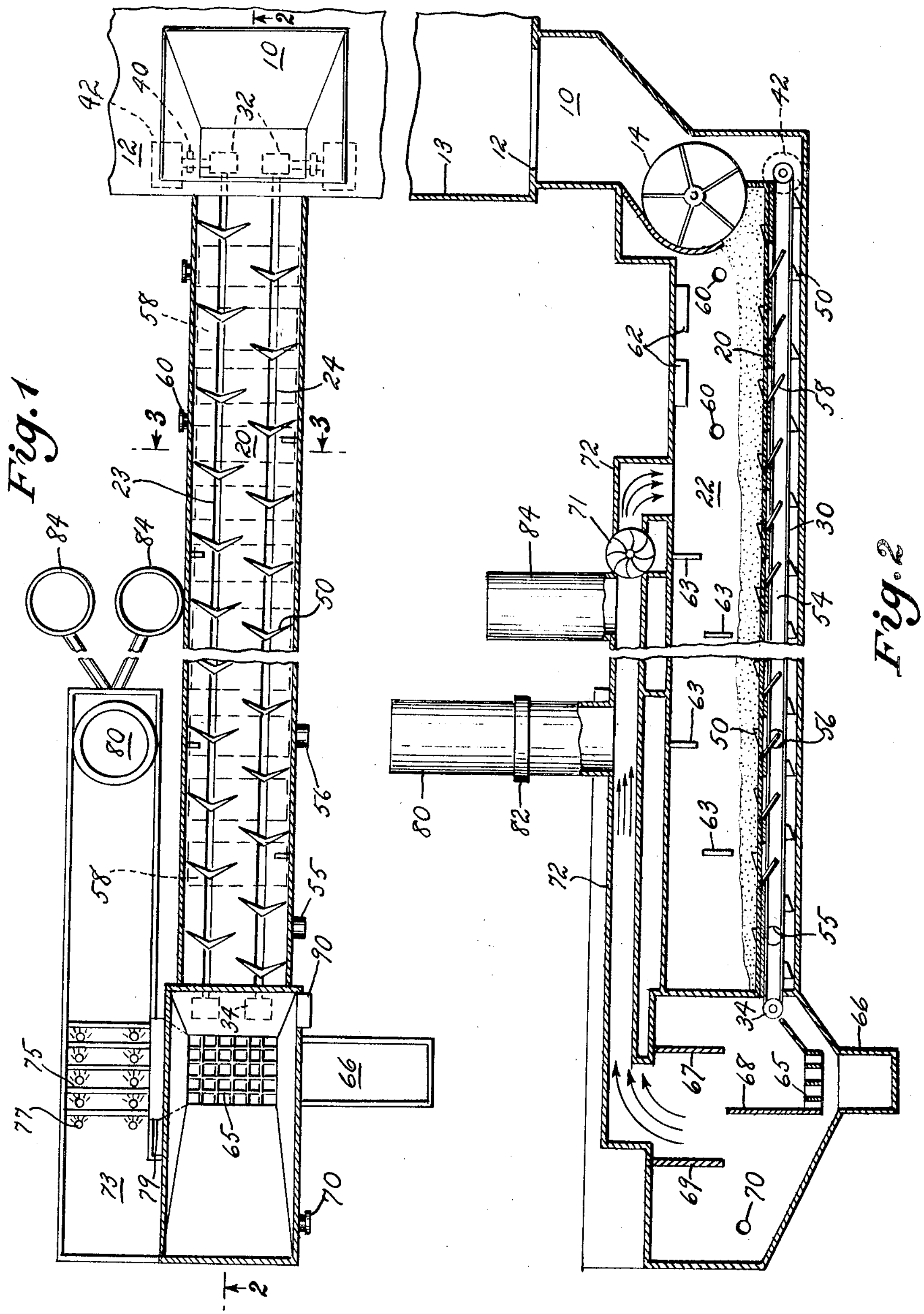

INCINERATOR
Filed March 13, 1969 2 Sheets-Sheet 2
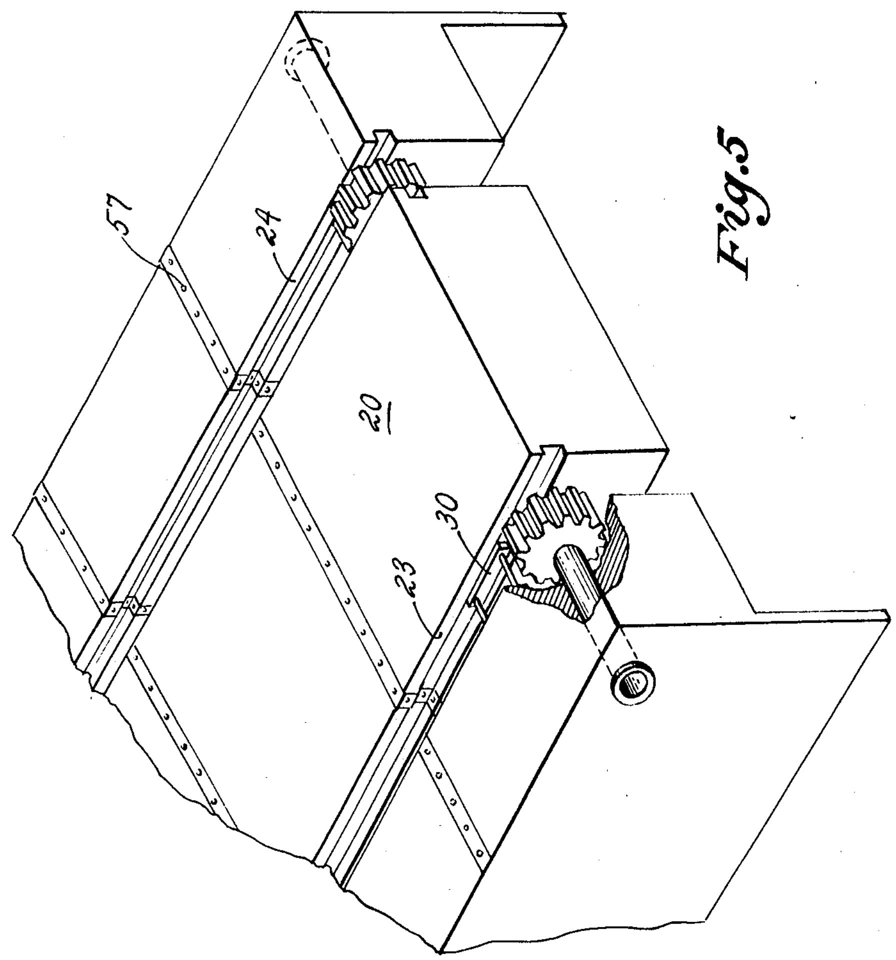
Fig.5
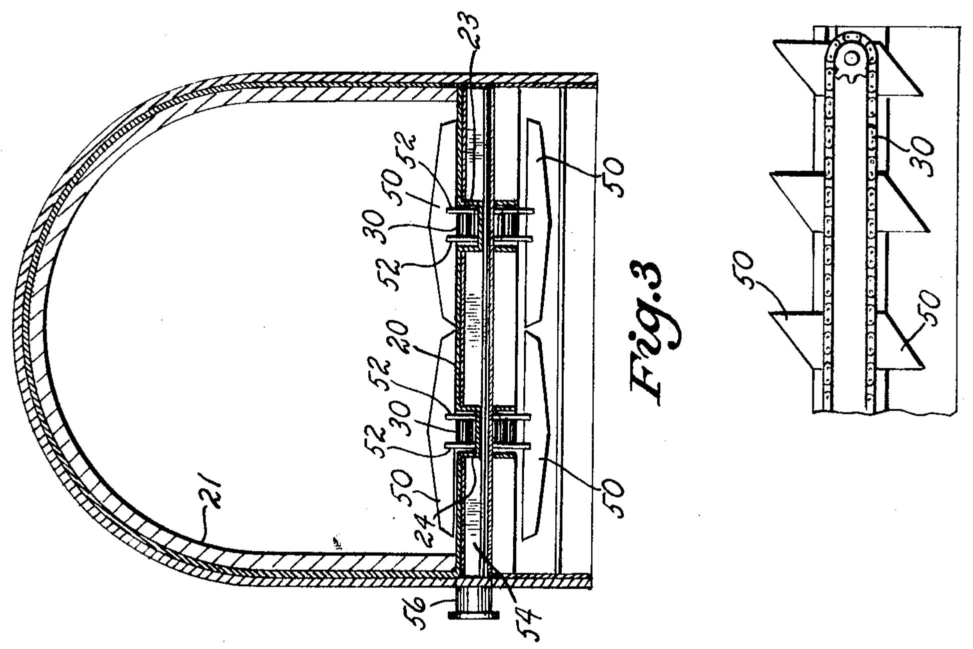
Fig.3
Fig.4

United States Patent Office 3,515,078

Patented June 2, 1970

3,515,078

INCINERATOR

Anthony J. Maitilasso, Rockaway, N.J., assignor to Scientific Incineration Devices, Inc., East Orange, N.J., a corporation of New Jersey Filed Mar. 13, 1969, Ser. No. 806,996
Int. Cl. F23g *5/04*
U.S. Cl. 110—8 7 Claims

ABSTRACT OF THE DISCLOSURE

An incineration apparatus in which refuse is incinerated while traversing a stationary grate under the influence of traveling plows.

The present invention relates to the incineration of refuse. More particularly, it relates to an incinerator apparatus in which refuse is consumed by burning over a stationary grate while being simultaneously agitated and conveyed along said grate by a series of conveyor plows.

In accordance with the present invention, an incineration apparatus consists of means for supplying refuse to an elongated perforate stationary grill, a plurality of parallel endless conveyor drive means traversing said grill along its length, each of said drive means carrying thereon a succession of plow members having a central forwardly projecting apex and rearwardly laterally projecting wings tapering downwardly from said apex, said plows being removably affixed to said drive means, substantially the entire lateral width of said grate being traversed lengthwise by the plows carried by said parallel drive means, means for introducing cooling and combustion air through said grill and over both said drive means and said plows into refuse thereon, means defining an incineration chamber disposed above said grill, refuse ignition and drying means disposed along said chamber above said grill, and ash and flue gas disposal means at the end of said grill remote from said feeding means.

Various features of the present invention will be further illustrated in conjunction with the appended drawings, which are illustrative of but not limitations on the present invention.

In the drawings:

FIG. 1 is a plan view of an incinerator in accordance with the present invention (with the roof removed for clarity of illustration);

FIG. 2 is a view in elevation of the incinerator of FIG. 1;

FIG. 3 is a view in cross-section on an enlarged scale of the primary combustion chamber of the apparatus of FIG. 1 taken along the lines 3—3 thereof;

FIG. 4 is a side view in detail of several of the plows used in the device of FIGS. 1–3; and FIG. 5 shows details of the sprocket and chain assembly used in driving the plows of FIG. 4.

In the figures, a hopper 10 is provided in the dump deck 12 of a suitable building 13. Refuse deposited in the hopper is fed by a variable rate feeder 14 onto a stationary perforated grill 20 approximately six feet wide and sixty feet long. The grill 20 is enclosed within an arch 21 of firebrick to form a primary combustion chamber 22. A pair of troughs 23 and 24 run longitudinally one each down the center of each half of the grill 20, and a drive chain 30 is disposed in each thereof.

The drive chain 30 is of endless construction and passes over sprockets 32 and 34 mounted at each end of the grill. The sprockets 32 near the hopper 10 (which are at the cooler end of the grill 20), are driven through a clutch 40 from a combined gearbox and drive motor

42. The sprockets 34 at the other end of the grill are idler sprockets.

A series of plows 50 are mounted on their centers along the length of the drive chain 30, and after traversing the length of the grill 20, the chain 30 and plows 50 thereon return under the grill as illustrated.

The plows are about three feet wide, being slightly less than half the width of the grill 20 so that they can clear each other and the walls of the primary combustion chamber 22. The plows are uniformly spaced along each chain at intervals of approximately four feet, and the parallel chains are operated such that the plows on the two chains are uniformly staggered with respect to each other. The plows 50 are removably bolted to the drive chain through a pair of plates 52 which depend from the plows near the center thereof to mate with the drive chain.

Each plow 50 is generally rearwardly V-shaped, with a uniform linear downward and rearward sweep from a leading central apex to the outer tips of the wings thereof. The trailing edge of each plow is substantially vertical. As indicated, the plows are characterized by an apex angle of about 140° and by a lift angle (for refuse) of approximately 30°. This is the preferred lift angle in that it maximizes aeration and agitation of the refuse, however this angle may vary from approximately 20° to about 45°, with slightly reduced efficiency of tumbling and agitation. The plows travel, of course, at a considerably greater speed than the refuse, this differential resulting in a tumbling and agitation action.

The plows 50 project above the upper face of the conveyor drive chain 30. The height of the plows is substantially less than the intended depth of the refuse deposited on the grill 20.

The region under the grill 20 forms a plenum 54 for underfire air admitted through inlets 55 and 56 therefor disposed along the length of the plenum. The grill 20 is perforated periodically at stations disposed along its length by a transverse row of orifices 57 best shown in FIG. 5, and the passage of air through the orifices 57 is controlled by adjustment of dampers 58.

A series of auxiliary burners 60 is disposed along the arch 21 of the combustion chamber 22 to dry and ignite the refuse and to maintain combustion in the primary combustion chamber 22. In addition, over-fire air inlets 62 are provided for air delivered by intake fans (not shown) to the upper portion of the chamber, as are baffles 63 for control of gas flow therein.

Incinerated material is delivered from the grill 20 onto a honeycomb 65, under which is disposed an ashpacking and removal system 66. The gaseous products of combustion and entrained fly ash pass over baffles 67, 68 and 69 disposed above the honeycomb, and then are conducted through the flame of a primary after-burner 70 (to ensure complete combustion) into a conduit of enlarged cross-sectional area to reduce velocity and through two 90° turns to effect a 180° change in direction. A portion of the gaseous products of combustion are withdrawn from above the honeycomb 65 by a recycle fan 71 through a duct 72 and returned to the primary combustion chamber 22.

After changing direction, the gases and entrained fly ash enter a "low-velocity" chamber 73 of enlarged cross-section in which they pass at reduced velocity over a series of interiorly water-cooled baffles 75 on which the fly ash becomes entrained and from which the entrained fly ash is removed by water sprays 77. The cooling action of the baffles and water sprays effects a further reduction in velocity, aiding in segregation of entrained fly ash from the flue gas.

The fly ash removed from the baffles 75 falls by gravity to a collection trough 79 at the bottom of the "low-velocity" chamber 73 in which it is separated from the water with which it is collected. The water is then recirculated over the baffles 75.

The collection trough 79 is aligned longitudinally with, and discharges its solids into, the ash-disposal system 66 under the honeycomb 65.

Flue gas from which the fly ash has been removed in the "low-velocity" chamber 73 is then discharged upwardly through a stack 80 provided near its base with an after-burner 82 for use if necessary. In addition, a pair of water scrubbers 84 are also provided for use as an alternative to the stack 80 in the event they are required.

The water cooled baffles 75 which depend from the upper portion of the "low-velocity" chamber 73 are vertically movable to permit adjustment of the effective cross-sectional area of the chamber 73 into which they project in order to control the pressure drop through the system as may be appropriate during startup and running operations. Thus, by lowering these baffles the pressure drop across the "low-velocity" chamber 73 may be increased as appropriate during start-up or shut-down when the flow rate of the flue gas is relatively low. During periods of normal, on stream operation, flue gas is generated at an increased rate, and the baffles 75 may be raised.

The alignment of the collection trough 79 with the ash disposal pit 66 is highly effective in combining these two sources of disposed solids and also in conserving water. In this connection, it should be mentioned that a clean-out door 90 is provided near the honeycomb 65 to permit access to the honeycomb for removal from the honeycomb of any large solids which may accumulate thereon.

In operation, self-combustion helps maintain the temperature of the upper surface of the refuse in the primary combustion chamber near the discharge end thereof at from about 1100° F. to about 1400° F., with typical gas temperatures in the chamber being from 1600° to 1800° F. However, the insulating action of the refuse on the grill 20 and the cooling action of the air discharged through the grill from the plenum 54 thereunder maintains the chains 30 and plows 50 at a temperature below a maximum of about 700° F. Aeration of the refuse by the plows 50 and injected air from the plenum 54 assists, of course, in complete combustion thereof.

The height of the refuse on the grill 20 may be controlled by the rate at which it is fed through the variable rate feeder 14, the speed at which the plows 50 are driven by the chains 30, and the temperatures maintained in the furnace. The use of two, independently driven sets of parallel chains and plows is highly advantageous in that if one set breaks down the other can still function. However, jamming or breakdown of these conveyor systems is infrequent inasmuch as the clutches 40 minimize the force of jamming and the reversible drives 42 permit ready reversal of the direction of motion of the plows 50 to free them of any obstructions.

Even in the event that one conveyor system may become temporarily stalled, the parallel companion chain and plows normally remain operative with the result that the incinerator operates at greater than 50% capacity because of the stationary burning which occurs over the inoperative chain. If an inoperative chain and plows can not be cleared by reverse driving thereof, normally it will be cleared in time by stationary incineration of the refuse causing the difficulty.

The air flow to the system is controlled and zoned to regulate temperatures along the length of the primary combustion chamber by the injection of fresh air through the over-fire air inlets 62 and the under-fire air inlets 55 and 56 and the recycle of air through the duct 72 by the fan 71.

The shape of the plows 50 is an important feature of the present invention in that when proportioned as shown, the refuse slides over the plows to a large extent and is aerated rather than being carried forward on the surface thereof.

It is to be understood that the invention herein illustrated and described is to be limited only by the scope of the claims appended hereto, and that various changes and equivalents may be substituted without departing from the true spirit of the invention.

What is claimed is:

1. An incineration apparatus which consists of means for supplying refuse to an elongated perforate stationary grill, a plurality of parallel endless conveyor drive means traversing said grill along its length, each of said drive means carrying thereon a succession of plow members having a central forwardly projecting apex and rearwardly laterally projecting wings tapering downwardly from said apex, said plows being removably affixed to said drive means, substantially the entire lateral width of said grate being traversed lengthwise by the plows carried by said parallel drive means, means for introducing cooling and combustion air through said grill and over both said drive means and said plows into refuse thereon, means defining an incineration chamber disposed above said grill, refuse ignition and drying means disposed along said chamber above said grill, and ash and flue gas disposal means at the end of said grill remote from said feeding means.

2. An incineration apparatus as set forth in claim 1 in which said flue gas disposal means includes a conduit having a 180° turn therein.

3. An incineration apparatus as set forth in claim 2 in which said conduit connects said incineration chamber to a means for removing fly ash from said flue gas.

4. An incineration apparatus as set forth in claim 1 in which an air plenum is disposed below said grill.

5. An incineration apparatus as set forth in claim 1 in which each of said conveyor drive means is powered through independent clutch and drive means.

6. An incineration apparatus as set forth in claim 1 in which said conveyor drive means are chains and said plow members are attached thereto at uniform intervals.

7. An incineration apparatus which consists of a feeder for supplying refuse to an elongated perforate stationary grill, a pair of parallel endless chains traversing said grills along their length on the upper surfaces thereof and returning under said grills, each of said chains carrying thereon a uniformly spaced succession of plows each of which has a central forwardly projecting apex and rearwardly laterally projecting wings tapering downwardly from said apex, the trailing edge of said plows being substantially vertical, said plows being removably affixed to said drive chains and each such plow extending laterally substantially half way across said grill, a firebrick arch defining an incineration chamber above said grill, burner nozzles disposed lengthwise along said arch above said grill for drying and igniting refuse, an ash disposal means at the end of said grill remote from said feeder, a conduit for flue gas having a 180° turn therein, said conduit connecting said incineration chamber to a fly-ash removal chamber having therein baffles for entrainment of fly ash, water sprays for washing fly ash from said baffles into a pit therebelow, said pit discharging into said ash disposal means, a stack for discharging washed flue gas, and independent clutch and drive means for operating said chains independently of each other.

References Cited

UNITED STATES PATENTS

| | | | |
|---|---|---|---|
| 2,116,573 | 5/1938 | Harrington | 110—15 |
| 2,752,869 | 7/1956 | Keenan | 110—15 XR |
| 3,200,776 | 8/1965 | Simpson | 110—15 |

KENNETH W. SPRAGUE, Primary Examiner

U.S. Cl. X.R.

110—15, 40